United States Patent
Bierlein

[15] 3,650,601
[45] Mar. 21, 1972

[54] MAGNETO-OPTIC DEVICE HAVING ALTERNATE LAYER FILM STRUCTURE

[72] Inventor: John David Bierlein, Wilmington, Del.

[73] Assignee: E. I. du Pont de Nemours and Company, Wilmington, Del.

[22] Filed: Nov. 19, 1970

[21] Appl. No.: 91,050

[52] U.S. Cl. ................... 350/151, 340/174.1 M, 350/160
[51] Int. Cl. .................................................. G02f 1/18
[58] Field of Search .................... 350/151, 160; 340/174.1 M

[56] References Cited

UNITED STATES PATENTS 3,142,720   7/1964   Adams ............................... 350/151

Primary Examiner—David Schonberg
Assistant Examiner—Paul R. Miller
Attorney—D. R. J. Boyd

[57] ABSTRACT

Kerr magneto-optic transducers having enhanced conversivity can be fabricated using a plurality of thin magnetic mirror layers spaced by dielectric layers having a thickness of approximately $\lambda/4$ where $\lambda$ is the wavelength of the light employed for readout.

4 Claims, 1 Drawing Figure

Patented March 21, 1972  3,650,601
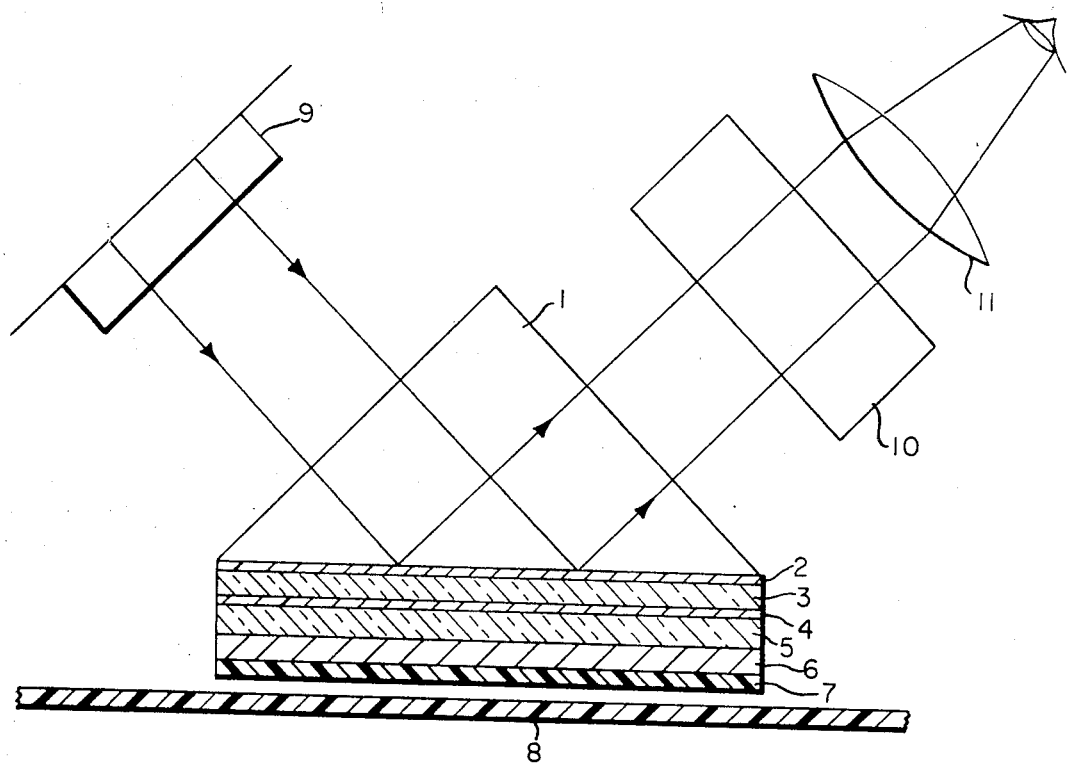
INVENTOR
JOHN DAVID BIERLEIN
BY
ATTORNEY

MAGNETO-OPTIC DEVICE HAVING ALTERNATE LAYER FILM STRUCTURE

BACKGROUND OF THE INVENTION

1. Field of the Invention

This invention relates to an improvement in magneto-optic surfaces. More particularly, this invention relates to a structured magneto-optic surface having enhanced Kerr conversivity.

Magneto-optic mirrors have been employed heretofore to read out a pattern of magnetization on a magnetic recording member in the form of an optical image. The magneto-optic mirror is placed in the magnetic field of the recording and a corresponding pattern of magnetization is induced on the mirror by the magnetic field from the pattern alone or with the assistance of a bias field which may be an alternating or a unidirectional field. Polarized light is then directed onto the magneto-optic mirror and the reflected light is observed through an analyzer generally set to extinguish the light reflected from the background. The pattern of magnetization corresponding to the image rotates the plane of polarization to a different degree from the background and thus appears as a pattern of light to the observer.

2. The Prior Art

It is well known that the degree of rotation (measured by the conversivity) induced by a change of direction of magnetization is very small. For a simple ferromagnetic layer, rotations of the order of 1 minute of arc are generally produced. Accordingly, it has been an objective of this art to increase the conversivity of magneto-optic mirrors. Thus Kolk and Orlovic, J. Appl. Phys. 34, 1060 (1963) have employed a thin magnetic film deposited on a silver mirror. Smith, J. Appl. Phys. 36 1120 (1965) has taught that the conversivity of a magneto-optic surface can be improved by depositing the magneto-optic mirror on the face of a prism, the prism being designed so that the angle of incidence of the light employed to interrogate the state of the mirror is close to the critical angle. Smith, U.S. Pat. No. 3,393,957 has also disclosed that improved conversivity can be obtained by the use of an optical matching system comprising a nonmagnetic layer, two dielectric layers and a magneto-optic layer. In a copending commonly assigned patent application Ser. No. 836,275, filed June 25, 1969, it has been disclosed that improved conversivity can be obtained using a magneto-optic layer deposited on the face of a prism arranged to provide illumination close to the critical angle, with a single matching dielectric layer and a mirror layer. Methods for calculating the optical properties of layered systems which can be applied to the above type have been described by Hunt, J. Appl. Phys. 38 1652 (1967).

Yet another approach to the problem is described in British Pat. No. 985,034, in which the magnetic material is formed into layered structure with layers of about 25 A. in thickness interlaced with thin insulating layers of dielectric about 7 A. in thickness to limit the mean free path of the electrons in the magnetic film. Ferromagnetic materials thus modified were shown to have enhanced conversivity.

SUMMARY OF THE INVENTION

The present invention is a magneto-optic device composed of an isotropic dielectric incident medium, preferably a prism, having a magnetic structure deposited on one face thereof. A pattern of magnetization imposed on the magnetic structure is detected by the rotation of the plane of polarized light incident on the structure from within the prism. For light of wavelength λ having an angle of incidence α the angle of the prism opposite the magnetic structure should be about 180°−2 λ. The magnetic structure is composed of a multilayer film structure, the films of which are in physical and optical contact and consist of at least two assemblies of i. a ferromagnetic layer, and
ii. a dielectric layer the thickness of the ferromagnetic layers being such that $$\sum_i d_i k_i < \frac{1.5\lambda}{4\pi} \quad (1)$$

when $d_i$ is the thickness of the $i^{th}$ ferromagnetic layer and $k_i$ is the imaginary part of the refractive index for the $i^{th}$ layer.

The refractive index and the thickness of the dielectric layers are determined by calculation to optimize the conversivity of the structure. In general, for a given total thickness of the ferromagnetic layer, two assemblies of ferromagnetic layers with interposed conversion matching layers provide an enhancement which is close to theoretical maximum possible. Since increasing the complexity of the structure increases the difficulty of construction, and increases the expense of manufacture, it is preferred to employ two ferromagnetic layers.

Again, while it is possible, from the point of view of the optical system, to employ differing magnetic materials for the different ferromagnetic layers, this is generally not desirable for ease of construction. Further, since the pattern of magnetic signals are desirably impressed uniformly on the magnetic layers, it is preferred that the layers should be of the same ferromagnetic material and should have about the same thickness.

THE DRAWING

The accompanying drawing is a schematic view of a prism having a magnetic mirror coating according to the present invention. In order to render the various layers visible, the dimensions of the layers are greatly exaggerated in comparison to the prism.

Referring to the drawing, an optical glass prism, 1, is employed which should be as free of strain as possible. On one face of the prism is deposited a layer of ferromagnetic material such as iron, 2, followed by a dielectric layer, 3, forming a first assembly. A second assembly of a ferromagnetic layer, 4, followed by a second dielectric layer, 5, are likewise deposited on the first assembly. A layer of a reflecting metal, 6, is deposited on the dielectric conversion matching layer, 5, of the second assembly. Optionally, a wear layer, 7, is deposited on reflecting layer, 6.

Magnetic signals from a magnetic recording member, 8, are impressed on the ferromagnetic layers, 2 and 4. The pattern of magnetization is observed by a beam of polarized light from a source, 9, which is reflected from the face of the structure and after passing through an analyzer, 10, is imaged for observation by lens, 11.

DETAILED DESCRIPTION OF THE INVENTION

The present invention is directed to improving the conversivity of magneto-optic surface by the provision of an optical structure designed to optimize the interaction between the light employed for readout and the ferromagnetic material of the structure.

The medium through which light is directed to the magneto-optic surfaces can, in principal, be any isotropic dielectric which is transparent to the electromagnetic radiation employed for readout, has a suitable refractive index, and which has a form adapted to permit illumination of the magneto-optic surface and observation of the reflected light. The medium should provide support for the magneto-optic surface, so that the surface away from that interrogated by the light is accessible to magnetic fields, and therefore a solid transparent dielectric should be employed. The best results are obtained when the angle of incidence at the interface between the support and the first magneto-optic layer is close to but less than the critical angle for reflection between the support medium and the first dielectric layer. Accordingly, the support medium should be a prism of high refractive index optical glass having a roof angle opposite the magnetic mirror which is 180°−2 αwhere α is the design angle of incidence, i.e., at the design angle of incidence the polarized light employed to detect the state of polarization of the magneto-optic surface will enter and leave the prism normal to the faces thereof.

The magnetic layer can be iron, cobalt, nickel, or alloys of any magnetic material which can be prepared in the form of a thin film of controlled thickness.

The thickness of the ferromagnetic layers must be such that the total thickness of the layers is less than the optical penetration depth for the light employed. This condition is expressed by relation (1). For iron, the refractive index N at 5,800 A. is 2.5+i3.5. The maximum thickness should be less than 200 A, i.e., for a structure in which two iron layers are employed, two layers of iron < 100 A in thickness are suitable.

The dielectric layers which form the conversion matching layers must have a suitable refractive index and be capable of being formed into thin films of controlled thickness. The thickness is of the order of $\lambda/4$.

There are many dielectric materials (refractive index range from 1.26 to 4.0) that can be formed as thin film and therefore are possible materials for the dielectric layers in the proposed structures. Lists of such materials can be found in J. T. Cox and G. Hass, "Physics of Thin Films", Academic Press, New York, 1964, Vol. 2, P. 284, and in O. S. Heavens, Repts. Prog. Phys. 23 1 (1960).

The reflecting material can be any highly reflecting metal such as Ag, Al, Rh, Cu, Au, Cr, and the like in sufficient thickness to be opaque to light.

Since the final reflecting layer of the structure is opaque, the entire structure is optically isolated, and when this layer is also physically durable, the structure will be physically isolated as well. When this metallic layer is not physically durable, e.g., Ag, additional wear layers can be placed after the metallic layer without disturbing the optical characteristics of the structure.

When an additional wear coating is desirable, this coating can be of any material or series of materials (metals, dielectrics, scratch-resistant plastics, etc.) with good wear characteristics that can be formed in a thin film and that will adhere well to the rest of the structure. If necessary, an additional layer can be placed between the metallic reflecting and wear layers to improve adhesion.

The techniques used for depositing the films in making the structures of this invention are well known and include resistance heating vapor deposition, chemical vapor deposition, electron beam deposition, and sputtering. Because of the small thickness needed for the magneto-optic layer, the depositions should be carried out in a clean system, and where appropriate, in a vacuum of at least $10^{-6}$ mm. Hg.

The film thickness can be monitored either optically or by using a crystal oscillator. In the optical method, the reflectance ($p$ or $s$) is calculated theoretically as described hereinafter for each deposition and this calculated curve can then be used to control film thickness. Also, deviation from the calculated curves can be used to detect variations in the optical constants as the deposition proceeds and to observe the formation of unwanted film formed between sequential depositions. Such parameters as deposition rate can best be controlled with a crystal oscillator.

The choice of particular materials, and the thickness of the layers in a given structure cannot be described simply, and in general it is necessary to employ a computer to determine the refractive indices and thickness of the films which optimize a particular structure. However, there are certain general results for any structure that can be applied to minimize the number of parameters to be varied. These are:

1. For metallic magneto-optic materials (e.g., Fe, Co, Ni, and their alloys), the maximum conversivity occurs for minimum film thickness assuming optical constants of this film do not vary appreciably from their thick film values.

2. Generally, $r_{ps}$ is greater than $r_{sp}$ so optimization should be accomplished for s incident light.

3. Conversivity increases nearly linearly with the square of the refractive index of the incident material for constant angle of incidence.

4. The angle of incidence that gives maximum conversivity is close to but less than that required for internal reflection to occur at the interface of the metal and dielectric layer.

5. The conversivity increases with the reflectivity of the final metallic layer.

With the above guidelines, the prism material, the magnetic films and the reflecting layer are selected. An angle of incidence and the wavelength of light to be employed are then chosen. The thickness and refractive index of matching layers to optimize the conversivity and minimize the conversivity of the structure are then calculated. Having determined the optimum values, specific materials are selected for the dielectric layers which have refractive indices close to the optimum values.

The structure of the present invention can be analyzed theoretically using the method of Hunt, J. Appl. Phys. 38, 1652 (1967). Using this method the Fresnel reflection coefficients for a particular structure can be determined. These coefficients are defined by the equations $$\begin{pmatrix} E_p^r \\ E_s^r \end{pmatrix} = \begin{bmatrix} r_{pp} & r_{ps} \\ r_{sp} & r_{ss} \end{bmatrix} \begin{pmatrix} E_p^i \\ E_s^i \end{pmatrix} \qquad (2)$$

where $E_p^r$ and $E_p^i$ are, respectively, the reflected and incident electric field amplitudes polarized in plane of incidence; and $E_s^r$ and $E_s^i$ are these components polarized perpendicular to the plane of incidence. The coefficients $r_{pp}$ and $r_{ss}$ are the usual Fresnel reflection coefficients for p and s light, respectively, and the magneto-optic reflection coefficients for $p$ and $s$ incident light are $r_{sp}$ and $r_{ps}$, respectively. For the longitudinal Kerr effect where the magnetization lies in both the plane of the incidence, the coefficients, $r_{ss}$ and $r_{pp}$, are to first order in magnetization, independent of the magnetization, while $r_{sp}$ and $r_{ps}$ depend on the magnetization through the magneto-optic scattering parameter Q. This parameter is defined in the complex permittivity tensor by $$\epsilon = \epsilon_o \begin{pmatrix} 1 & -iQ & 0 \\ iQ & 1 & 0 \\ 0 & 0 & 1 \end{pmatrix} \qquad (3)$$

where $\epsilon_o$ is the dielectric constant of the material for zero magnetization. In addition, all the Fresnel coefficients depend on the refractive indices of the incident material and metallic reflecting layer, angle of incidence, the refractive index and thickness of all interlying layers- and the wavelength of the incident light.

To optimize the overall magneto-optic properties of a particular structure it is necessary to (1) maximize the magneto-optic conversivity $(|r_{sp}|^2$ and/or $|r_{ps}|^2)$, and (2) minimize the phase difference between the magneto-optic and the corresponding normal Fresnel reflection coefficients, i.e., to minimize the ellipticity of the reflected light. Condition (2) above can be relaxed if a compensator (e.g., Babinet-Soleil compensator, one-fourth wave plate, etc.) is used in connection with the magneto-optic surface. But, from a practical viewpoint, it is advantageous to incorporate the compensation in the magneto-optic structure itself rather than use an additional component in an optical system.

In order to determine if the predicted structure has been achieved, it is desirable to measure the reflectivity and the compensated rotation of the structure. The compensated rotation is the rotation measured when the ellipticity of the reflected light is zero. These quantities can be obtained using a polarizer, analyzer, and compensator along with a light source, filter, and detector. From these two quantities, the magneto-optic Fresnel coefficient can then be determined from the relation $$k = \sqrt{R\theta}$$

where, for either $p$ or $s$ incident light, $R$ is the reflectivity and $\theta$ and $k$ are the corresponding rotation and magneto-optic Fresnel reflection coefficient, respectively.

In the following table, Table I, there is shown the calculated magnitude of the Fresnel coefficient $|r_{ps}|$, obtained with optimized structure of the present invention for a prism of optical glass having a refractive index of 1.88 and for a design angle of incidence of 50° and a design wavelength of 5,800 A. In the table, the layer numbers refer to the layers as shown in the accompanying drawing. In each instance the magnetic film of the magneto-optic structure was iron $N=2.5+i3.5$ and the final reflecting layer (layer 6) was silver $N=0.070+i3.4$ having a thickness of about 1,000 A.

TABLE I. CALCULATED CONVERSIVITY OF VARIOUS MAGNETO-OPTIC STRUCTURES

[Prism $N=1.88$, angle of incidence 50°, $\lambda = 5800$ Å, iron magnetic layers, silver reflector.]

| Layer 2 | Layer 3 | | Layer 4 | Layer 5 | | $|r_{ps}| \times 10^3$ |
|---|---|---|---|---|---|---|
| Thickness Å | Thickness Å | N | Thickness Å | Thickness Å | N | |
| 100 | 2550 | 1.61 | | | | 11.7 |
| 100 | 3600 | 1.61 | 100 | 2550 | 1.61 | 12.8 |
| 100 | 1900 | 1.93 | 100 | 1650 | 1.93 | 14.1 |
| 50 | 2750 | 1.61 | | | | 15.5 |
| 50 | 3750 | 1.61 | 50 | 2750 | 1.61 | 21.2 |

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. A magneto-optic device for converting a pattern of magnetic signals on a magnetic layer to an optical image by rotation of the plane of polarized light reflected from said layer consisting essentially of:
   a. an isotropic dielectric incident medium of refractive index $N$ at the wavelength $\lambda$ of the incident light;
   b. a multilayer film structure of one face of said medium having layers in physical and optical contact composed of, in sequence, at least two assemblies of:
      i. a ferromagnetic layer, and
      ii. a dielectric layer the thickness of the ferromagnetic layer being such that $$\sum_i d_i k_i < \frac{1.5\lambda}{4\pi}$$

when $d_i$ is the thickness of the $i^{th}$ magnetic layer and $k_i$ is the imaginary part of the refractive index of said layer, each of said dielectric layer having a thickness and a refractive index calculated to optimize the coercivity of said magneto-optic device; and
   c. a nonmagnetic metallic reflecting layer opaque to light of wavelength $\lambda$.

2. The device of claim 1 in which said incident medium is a prism having the said multilayer film structure deposited on one face thereof opposite an edge of the prism having an angle of $180°-2\alpha$, where $\alpha$ is the angle of incidence of the incident light on said multilayer film from within said prism.

3. The device of claim 2 in which said ferromagnetic layer is iron.

4. The device of claim 2 in which said reflecting layer is silver.

* * * * *